Sept. 16, 1958      B. L. JOHNSON      2,851,769
GREASE CAP ASSEMBLING TOOL
Filed May 18, 1954
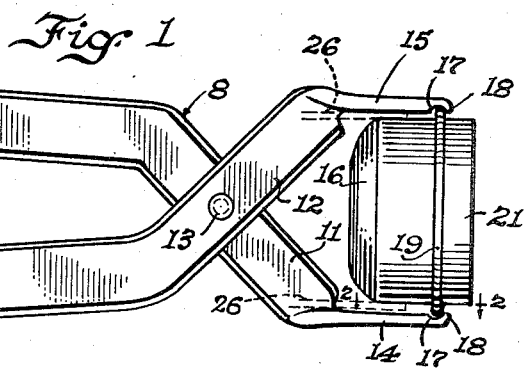
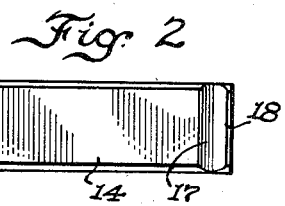
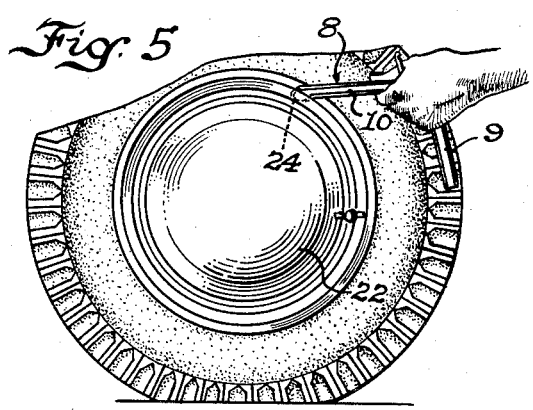
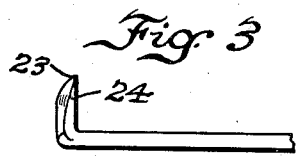
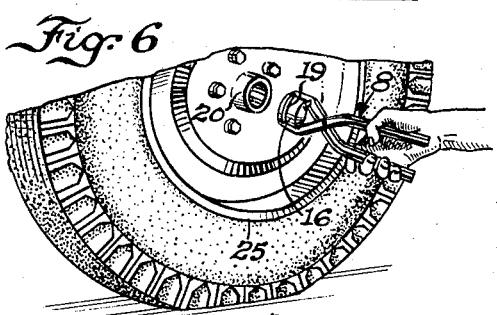
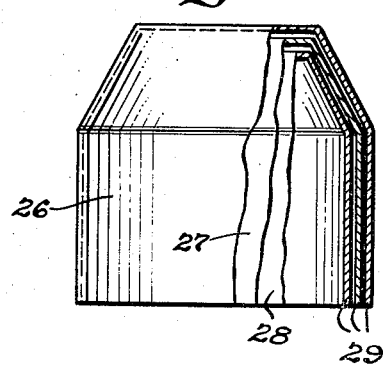
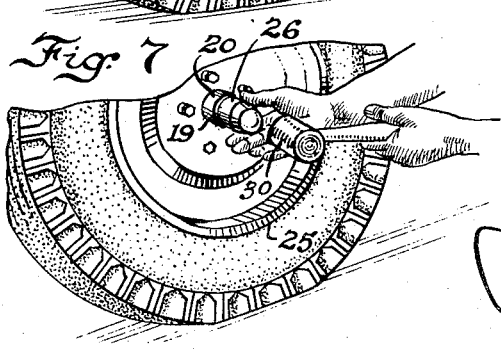
Inventor
Berd L. Johnson

United States Patent Office 2,851,769
Patented Sept. 16, 1958

2,851,769

GREASE CAP ASSEMBLING TOOL

Berd L. Johnson, Milwaukee, Wis.

Application May 18, 1954, Serial No. 430,483

1 Claim. (Cl. 29—245)

This invention relates to hub and grease cap nippers. Late model automobiles have large hub caps that are held in place by spring tongues, and each of these caps encloses an inner grease retaining cap that has a friction drive fit in the outer wheel hub bearing. It has been extremely difficult to remove the grease cap so long as the wheel was left in place on the hub, due to the way the cap is enclosed by the wheel hub projecting outwardly from the hub flange, making the small bead or flange on the grease cap rather inaccessible. As a result of the crude methods used in their removal the grease caps became so battered that in most cases new ones had to be substituted. The cost of such replacements, added to the extra labor cost involved as a result of the extra time required in the removal, meant unnecessarily high service charges to customers. It is, therefore, the principal object of my invention to provide a hub and grease cap tool designed to simplify removal of the hub cap and inner grease cap and eliminate the damage and loss of time heretofore involved in such work.

The invention is illustrated in the accompanying drawing, in which—

Fig. 1 is a side view of my improved hub and grease cap tool shown gripping the flange on a grease cap, as in the removal thereof from the wheel hub;

Fig. 2 is a view on line 2—2 of Fig. 1 showing one of the gripping jaws;

Fig. 3 is a view on line 3—3 of Fig. 1 showing the claw formed on the end of one of the handles;

Fig. 4 is a view partly in side elevation and partly in section showing a set of three nested grease cap drivers, and Figs. 5, 6, and 7 show the ways in which the tools of Figs. 1 and 4 are adapted to be used in the removal of a hub cap and an inner grease cap and in the replacement of the inner grease cap.

The same reference numerals are applied to corresponding parts throughout the views.

The reference numeral 8 designates the hub and grease cap tool of my invention generally, the same comprising a pair of handles 9 and 10 made of flat bar stock bent to provide angularly extending inner end portions 11 and 12 which are disposed in overlapping criss-crossed relation and pivotally connected by a rivet 13, the extremities of portions 11 and 12 being twisted through 90° to define elongated jaws 14 and 15 spaced far enough apart to straddle a grease cap like that indicated at 16 in Figs. 1 and 6. The extremities of jaws 14 and 15 have their inner sides cut away transversely thereof to define grooves 17 close enough to the ends and parallel with respect thereto so as to define fairly sharp teeth 18 as wide as the jaws adapted to be entered behind the annular flange 19 on a grease cap 16 so that it may be pried away from the end of a wheel bearing hub 20 into which the short neck 21 on the cap is pressed or driven with a tight friction fit. The cap, when pried loose, has its flange 19 gripped firmly at diametrically opposite sides in the grooves 17, as shown in Figs. 1 and 6, so that the cap may be held securely between the jaws of the tool until the operator is ready to place the cap on a clean support, where it will be kept available for replacement in the hub later, without likelihood of dirt or grit getting into the grease in the cap. In that way the operator's hands are kept free of grease and time is saved that would otherwise be wasted in wiping it off, and there is also avoided the annoyance of getting grease on the handles of other tools.

The same tool 8 is useful, as shown in Fig. 5, in the removal of the hub cap 22 by wedging engagement of the tapered edge 23 of the claw formed by the right angle bent end portion 24 of the one handle 10 between the rim of the cap 22 and the edge of the outer flange 25 on the hub portion of the wheel. It is this flange that projects so far forwardly from the plane of the outer end of the wheel bearing hub 20 that makes the problem of removing the grease cap 16 so difficult without a special tool of the present type especially designed for that particular operation, and, as a result, many grease caps become so badly battered it is not possible to use them again, and hence, caps that might otherwise easily last the life of the car have to be replaced almost every time the wheel bearings are serviced, and the cost of these caps is not as small an item as one might offhand suppose. The saving in time realized with the present tool is an even bigger factor. On many occasions a mechanic, if he does not happen to have the proper guide 26, 27 or 28 at hand, will use the tool 8 to replace the hub cap 22 rather than to take the time finding the particular driver that will fit the hub cap. In that event the hub cap is held by tool 8 in the manner shown in Figs. 1 and 6 and pressed by hand part way into the hub 20, and, then, while handles 9 and 10 are held in one hand, the outer ends of the handles are struck with a hammer, first one and then the other, to drive the hub cap all the way in. The right angle bend at 24 having the sharpened edge 23 on it can be struck with a hammer the same as the end of handle 9 without damage to the sharpened edge.

For the easier and better replacement of the grease caps 16 I provide cup-shaped driver tools or guides 26, 27 and 28 in three sizes adapted to be nested, as shown in Fig. 4, for compact packing and saving space in a tool box, these three sizes providing circular skirt portions 29 of the three diameters adapted to fit over the three diameters of grease caps 16 provided on different makes of automobiles and trucks. As shown in Fig. 7, the driver guide 26, or, for that matter, either of the guides 27 and 28, depending on the size of the grease cap 16, fits over the outer end portion of the cap in telescoping relation thereto, as indicated in dotted lines in Fig. 1, in abutment with the flange 19 on the cap, as shown in Figs. 1 and 7, so that the grease cap can be quickly and easily driven into place in the hub 20 with a hammer or mallet, as indicated at 30 in Fig. 7, the driver guide being held by the operator in one hand while the hammer or mallet is held in the other hand.

It is believed the foregoing description conveys a good understanding of the objects and advantages of my invention. The appended claim has been drawn to cover all legitimate adaptations and modifications.

I claim:

In a tool of the character described, a pair of elongated flat handles having angularly bent coplanar forward end portions extending in criss-cross relation and pivotally connected together in parallel planes and providing forwardly extending jaw portions twisted through 90° from the planes of the handles and disposed in spaced substantially parallel relation and adapted to straddle a grease cap of cylindrical form, each jaw portion having on its inner side next to its extremity a transverse groove adapted to receive the peripheral edge portion of an annularly projecting flange provided on the grease cap, said grooves being deep enough and so conformed in relation to the edge portion of the flange on the grease cap as to permit either push or pull operation of the grease cap when gripped between the jaws, the outer side of each groove defining the inner side of a wedge-shaped inwardly directed tooth formed on the extremity of each jaw adapted to be engaged wedgingly behind the flange between it and a wheel hub in which the grease cap is pressed to pry the cap loose, at least one of said handles having a right-angle-bent rear end portion, the outer side of said right-angle-bent rear end portion on one handle and the rear end of the other handle both lying in a common plane parallel to the plane of the grooves in said jaw portions when the latter are engaging the flange of a grease cap and providing striking surfaces for hammering on the tool to drive a grease cap home in a wheel hub, said right-angle bent rear end portion being also adapted to be struck with a hammer on the inner side thereof to assist in the removal of a grease cap.

References Cited in the file of this patent

UNITED STATES PATENTS

| | | |
|---|---|---|
| 236,617 | Paul | Jan. 11, 1881 |
| 317,318 | Davis | May 5, 1885 |
| 354,157 | Macmillan | Dec. 14, 1886 |
| 986,133 | Butsch | Mar. 7, 1911 |
| 1,604,479 | Pauly | Oct. 26, 1926 |
| 1,820,870 | Fisher | Aug. 25, 1931 |
| 2,266,511 | Predmore | Dec. 16, 1941 |
| 2,648,126 | Flicklinger | June 13, 1950 |